Aug. 10, 1926.
A. HOISS
1,595,719
TRANSMISSION MECHANISM
Filed August 6, 1925   3 Sheets-Sheet 1
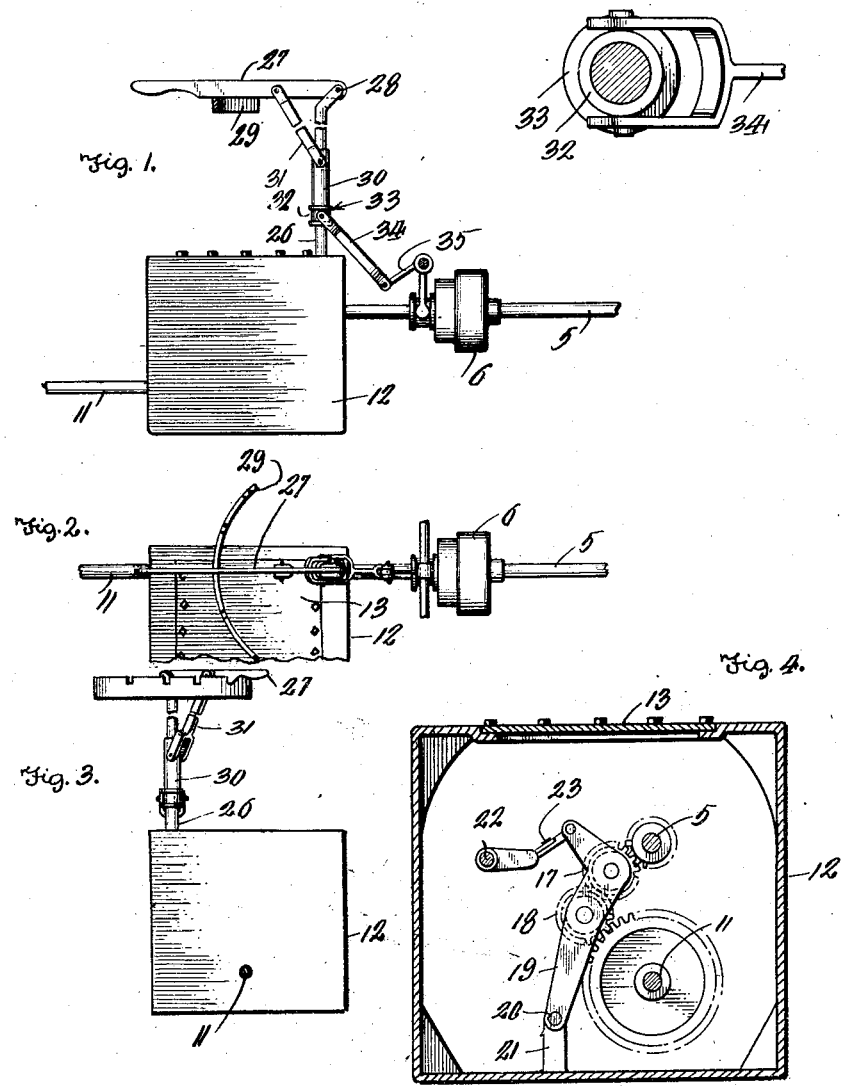
Anton Hoiss, Inventor

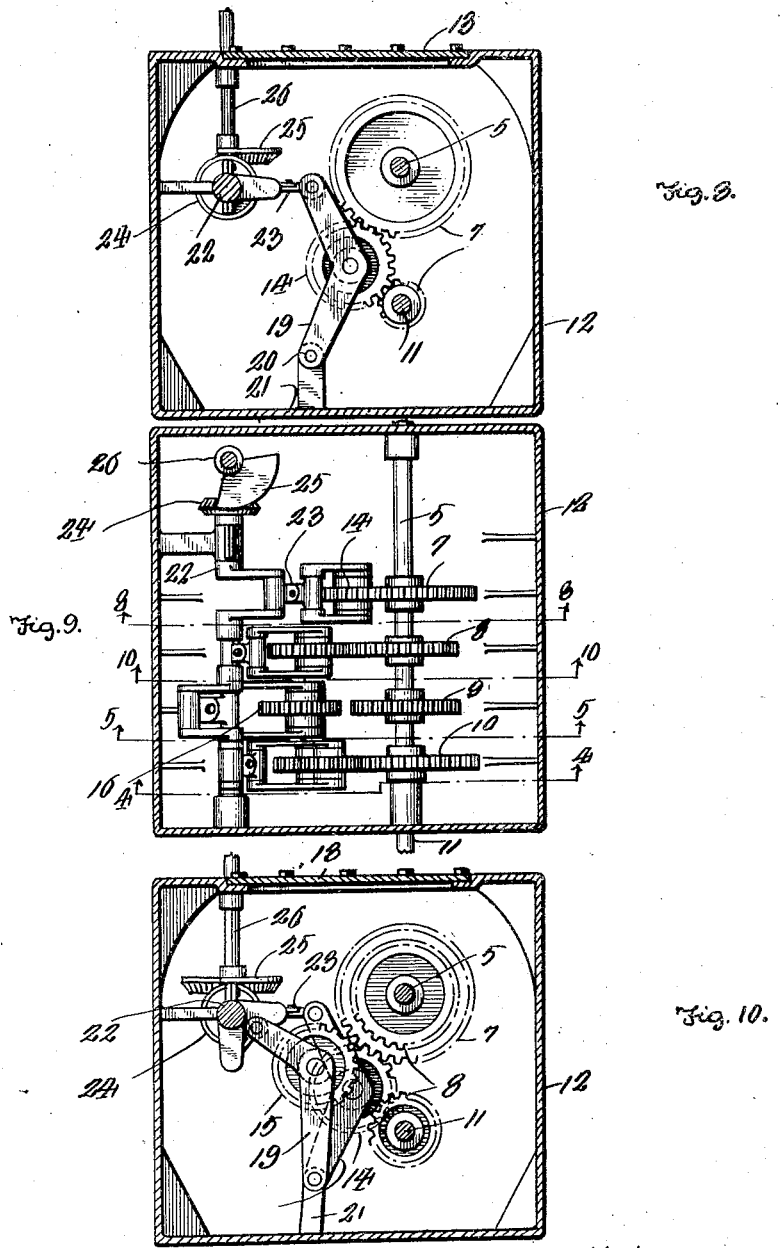

Patented Aug. 10, 1926.

1,595,719

UNITED STATES PATENT OFFICE.

ANTON HOISS, OF BUFFALO, NEW YORK.

TRANSMISSION MECHANISM.

Application filed August 6, 1925. Serial No. 48,630.

This invention relates to certain new and useful improvements in transmission mechanisms, and has more particular reference to an improved variable speed and reverse drive gearing particularly adapted for use in connection with motor vehicles.

The primary object of the invention is to provide a transmission mechanism of the above kind wherein the usual gears are normally not in mesh and have a permanent relative relation so as to not slide upon their respective shafts, operative connections being made between the gears of the sets by means of idler pinions movable laterally of the driving and driven shafts into and out of operative position.

A further object of the invention is to provide a transmission mechanism of the above kind which is extremely simple and durable in construction as well as efficient in operation.

A further object of the invention is to provide improved means for mounting the laterally movable idlers and improved means for effecting their individual movement to operative or inoperative position.

Other objects will appear as the nature of the invention is better understood, and the same consists in the novel form, combination and arrangement of parts hereinafter more fully described, shown in the accompanying drawings and claimed.

Figure 5:
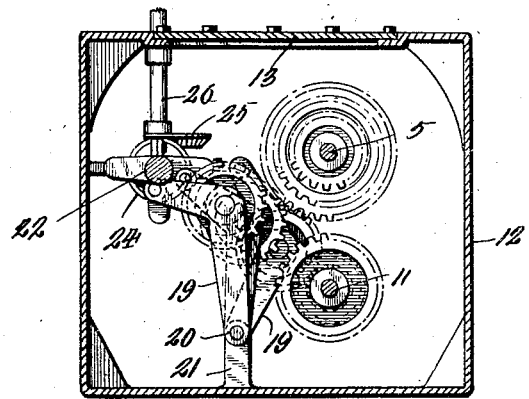
Figure 6:
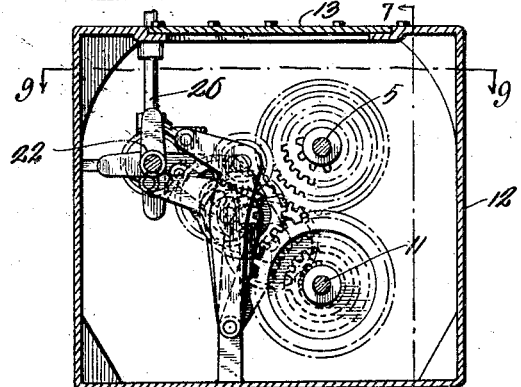
Figure 7:
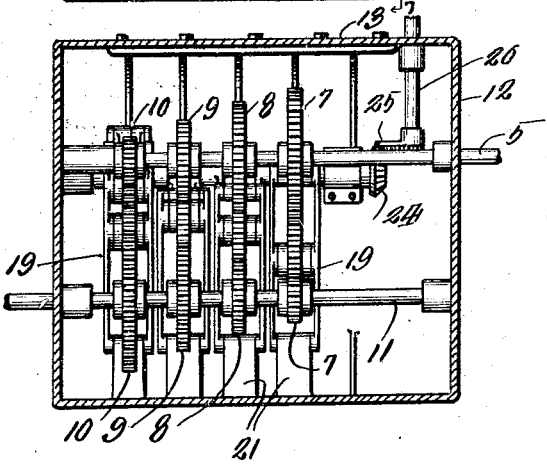

In the drawings, wherein like reference characters indicate corresponding parts throughout the several views, Figure 1 is a fragmentary side elevational view, partly in section, showing a transmission mechanism constructed in accordance with the present invention, and operatively associated with the clutch of the drive shaft, Figure 2 is a fragmentary top plan view of the device shown in Figure 1, Figure 3 is a rear elevational view thereof, Figure 4 is an enlarged transverse sectional view, with parts omitted for sake of clearness, and taken substantially upon line 4—4 of Figure 9, Figure 5 is a view similar to Figure 4 taken upon line 5—5 of Figure 9, Figure 6 is a transverse section taken substantially upon line 4—4 of Figure 9 but with the parts omitted in Figure 4 shown in place, Figure 7 is a vertical longitudinal section taken substantially upon line 7—7 of Figure 6, Figure 8 is a transverse sectional view taken substantially upon line 8—8 of Figure 9, Figure 9 is a horizontal section taken substantially upon line 9—9 of Figure 6, Figure 10 is a transverse section taken substantially upon line 10—10 of Figure 9, and Figure 11 is an enlarged fragmentary sectional view illustrating a detail of the invention.

Referring more in detail to the drawings, 5 indicates the usual drive shaft which extends rearwardly from the motor or internal combustion engine of a motor vehicle and has its sections releasably connected by means of a conventional form of clutch 6, a member of which is usually forced rearwardly by means of a foot pedal, not shown, for discontinuing drive from the section of the shaft 5 forwardly of the clutch to the portion or section thereof rearwardly of the clutch.

The gearing constituting part of the present invention consists of pairs or sets of super-imposed gears 7, 8, 9 and 10 the upper gears of the several sets being rigidly secured in spaced relation upon the rear section of the drive shaft 5, and the lower gears of the several pairs or sets being secured upon the forward end of a longitudinal driven shaft 11 disposed therebelow and extending rearwardly for connection with the usual differential mechanism employed in motor vehicles at the rear of the latter. The overlying ends of the rear section of shaft 5 and the shaft 11 are journaled in the ends of a suitable casing 12 having a removable cover plate 13, and the gears of the several sets are in spaced relation or out of mesh. As is usual in this class of devices, the gears progressively decrease in size rearwardly on the shaft 5 and increase in size rearwardly on the shaft 11 so that a variation in speed at which the shaft 11 is driven can be had.

Disposed beside each of the sets of gears 7, 8 and 9 is an idler pinion, the pinions for the sets of gears 7, 8 and 9 being respectively indicated as at 14, 15 and 16, and disposed beside the set of gears 10 are a pair of intermeshing idler pinions 17 and 18. The pinions 14, 15, 16 and the pinions 17 and 18 are mounted for movement laterally or transversely of the shafts 5 and 11 so that the pinion 14 may be meshed with the gears of the set 7 as shown in Figure 8 for transmitting the drive from the shaft 5 therethrough to the shaft 11 at a low speed. The several pinions 14, 15 and 16 are similar in size, and the pinion 15 may be moved so as to simultaneously mesh with the gears of the set 8 whereby the rotation of shaft 5 may be transmitted to the shaft 11 for driving the latter at an intermediate speed. In a like manner, the idler pinion 16 may be moved so as to simultaneously mesh with the gears of the set 9 so as to cause the motion of shaft 5 to be transmitted to shaft 11 at a third or relatively high speed, and the pinions 17 and 18 can be moved laterally so that the pinion 17 meshes with the upper gear of the set 10 while the pinion 18 meshes with the lower gear thereof as shown in Figure 4 so that shaft 11 is driven in a reverse direction for causing rearward traveling movement of the vehicle in which the transmission mechanism is employed.

The preferred manner of mounting the pinions for movement laterally or transversely of the shafts consists in mounting such pinions upon laterally swinging arms 19, the lower ends of which are pivoted as at 20 to upstanding posts or rigid brackets 21 provided upon the bottom of the casing 12. The pinions 17 and 18 are both carried by the same arm 19, while each of the other pinions 14, 15 and 16 is carried by a similar separate arm so that rotation of shaft 5 may be transmitted to the shaft 11 through a single set of gears at a time.

Means is provided for manually causing the desired one of the pinions 14, 15 and 16 or the pinions 17 and 18 to be respectively engaged with its or their cooperating set of gears, and for causing the others to be disengaged from their cooperating sets of gears. This means preferably embodies the provision of a horizontal crank shaft 22 which is disposed longitudinally of and journaled within the casing 12 at the outer sides of the arms 19 and near the upper ends of the latter, and the cranks of which are disposed in different radial planes. Each crank of the shaft 22 is connected to and transversely aligned with the upper end of one of the arms 19, and the connections between the cranks and the arms preferably consist of pitmen or links 23. It will thus be seen that when the shaft 22 is rotated, one of the pinions 14, 15 or 16 may be engaged with its cooperating set of gears while the others will be moved out of engagement with their sets of gears, or the pinions 17 and 18 may be engaged with their cooperating set of gears while the pinions 14, 15 and 16 are disengaged from the cooperating sets of gears thereof. The particular set of gears which is rendered operative in this way entirely depends upon the degree of rotation of shaft 22. Upon the forward end of the crank shaft 22 is secured a beveled gear 24 which meshes with a segment gear 25 secured upon the lower end of a vertical shaft 26 that extends upwardly through and is journaled in the top of the casing 12 and has a vertically swinging hand lever 27 pivoted at one end thereof to the upper end of the same as at 28. Disposed beneath the lever 27 and concentric with the shaft 26 is an arcuate segment 29 having notches in its upper edge adapted for selective reception of the adjacent portion of the lever 27 so as to hold the shaft 26 from rotation when the lever 27 is positioned coincident with and in any of these notches. The notches in the segment 29 are so arranged that when the pinion 14 is engaged with the gears of the set 7, the lever 27 is coincident with the left hand notch of the segment 29, while when the lever 27 is positioned to engage the second notch from the left, the pinion 15 is engaged with the set of gears 8, and when the lever 27 is positioned coincident with the third notch from the left as shown in Figure 2 the pinion 16 is engaged with the set of gears 9. The remaining right hand end notch of the segment 29 is disposed to receive the lever 27 when the pinions 17 and 18 are operatively disposed as shown in Figure 4, and it is thus apparent that the operator of the vehicle can accurately position the lever 27 for effecting the desired drive with facility and ease.

Means is provided for automatically effecting release of the clutch 7 so that the rear section of the shaft 5 will not be driven when the lever 27 is swung for changing gears and this means preferably consists of a sleeve 30 slidable upon the projecting upper end of the shaft 26 and having its upper end connected to the intermediate portion of the lever 27 by means of a link 31, the lower end of the sleeve 30 having a collar 32 rotatable thereon between a pair of spaced annular flanges 33, and a link 34 having one end bifurcated and pivoted to opposite sides of the collar 32 and extending forwardly and downwardly with its other end pivotally attached to the end of a rearwardly and downwardly projecting arm of a bell crank lever 35, the other arm of which is bifurcated and embraces the usual collar of the movable element of the clutch 6. It is thus apparent that when the lever 27 is raised for releasing the same from a notch of the segment 29 so that the shaft 22 may be rotated, an upward pull is exerted upon the rearwardly extending arm of the bell crank lever 35 for effecting rearward releasing movement of the movable clutch member of the clutch 6. On the other hand, it will be seen that when the lever 27 is swung downwardly into a notch of the segment 29 the movable member of the clutch 6 will be permitted to return to normal engaged position. In view of the above it is apparent that the rear section of the drive shaft 5 will be idle until such time as the desired gear change has been made and the lever 27 has been lowered into the coincident notch for maintaining such change operative. The present device involves a relative arrangement of parts readily accessible for renewal and repair and not of a delicate or complicated nature such as will tend to cause the device to readily get out of order. Furthermore, in the absence of sliding gears, stripping of teeth from the same is rendered unlikely.

It is believed that the construction and operation as well as the advantages of the present invention will be readily understood and appreciated by those skilled in the art.

Minor changes may be made without departing from the spirit and scope of the invention as claimed.

What I claim as new is:

1. In combination, a plurality of sets of gears, manually operable means to selectively render any desired set of gears operative, a clutch for normally transmitting rotation to corresponding gears of said sets, means to retain said manually operable means in any position at which it is set for rendering a desired set of gears operable, and means automatically operable upon release of said manually operable means from said retaining means for releasing said clutch, said manually operable means including a hand lever, and said automatically operable means including an operative connection between the lever and said clutch, and said retaining means including a segment provided with notches for reception of the hand lever when the latter is positioned to permit engagement of the clutch and from which the hand lever is disengageable for effecting release of the clutch.

2. In combination, a plurality of sets of gears, manually operable means to selectively render any desired set of gears operative, a clutch for normally transmitting rotation to corresponding gears of said sets, means to retain said manually operable means in any position at which it is set for rendering a desired set of gears operable, and means automatically operable upon release of said manually operable means from said retaining means for releasing said clutch, said manually operable means including a vertical rotatable shaft and a hand lever pivoted to the upper end of said shaft for vertical swinging movement, said automatically operable means including an operative connection between the lever and said clutch embodying a sleeve slidable on the vertical shaft with its upper end connected to the lever and its lower end connected to the clutch, and said retaining means including an arcuate segment provided with notches in its upper edge for reception of the hand lever when the latter is lowered to permit engagement of the clutch and from which the hand lever is disengageable for effecting release of the clutch when the hand lever is raised.

In testimony whereof I affix my signature.

ANTON HOISS.